United States Patent
Aina et al.

(10) Patent No.: US 12,456,291 B1
(45) Date of Patent: Oct. 28, 2025

(54) ARTIFICIAL INTELLIGENCE PIXEL SENSOR SYSTEMS AND METHODS

(71) Applicant: BAE Systems Space & Mission Systems Inc., Broomfield, CO (US)

(72) Inventors: Olaleye A. Aina, Broomfield, CO (US); Corey Allan Hahn, Broomfield, CO (US); Cynthia Garrett Wallace, Louisville, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 350 days.

(21) Appl. No.: 18/095,643

(22) Filed: Jan. 11, 2023

Related U.S. Application Data

(60) Provisional application No. 63/299,117, filed on Jan. 13, 2022.

(51) Int. Cl.
  *G06V 10/00* (2022.01)
  *G06V 10/75* (2022.01)
  *G06V 10/82* (2022.01)

(52) U.S. Cl.
  CPC ............ *G06V 10/82* (2022.01); *G06V 10/751* (2022.01)

(58) Field of Classification Search
  CPC ............................ G06V 10/82; G06V 10/751
  See application file for complete search history.

(56) References Cited

U.S. PATENT DOCUMENTS

| | | | |
|---|---|---|---|
| 10,275,706 B2 | 4/2019 | Pickett | |
| 10,861,538 B2 | 12/2020 | Gallo-Bourdeau et al. | |
| 10,910,559 B2 | 2/2021 | Defferriere et al. | |
| 2021/0264679 A1* | 8/2021 | Liu | G06V 40/19 |
| 2023/0274529 A1* | 8/2023 | Müller | G06V 10/20 |
| | | | 382/224 |

OTHER PUBLICATIONS

Mennel et al., Ultrafast machine vision with 2D material neural network image sensors, Nature 579, 62-66 (Year: 2020).*
"Prophesee Metavision for Machines White Paper: Event-based sensing enables a new generation of machine vision solutions," Prophesee, May 9, 2022, retrieved from https://www.prophesee.ai/wp-content/uploads/2022/05/PROPHESEE-White_Paper_Event_Based_Vision_EN_05_09_2022.pdf, 15 pages.

(Continued)

*Primary Examiner* — Xiao Liu
(74) *Attorney, Agent, or Firm* — Sheridan Ross P.C.

(57) ABSTRACT

Intelligent sensor systems and methods are provided. An intelligent sensor system as described herein includes an intelligent sensor array in which at least portions of a neural network are implemented in hardware. More particularly, multiple artificial intelligence pixels, each providing a neural network, can be included in the intelligent sensor system. Each artificial intelligence pixel includes a plurality of sub-pixel elements disposed across a portion of the intelligent sensor array. Each sub-pixel element includes a photodetector and a neuromorphic element. Weighted outputs from the sub-pixel elements within an artificial intelligence pixel are summed and compared to a reference value. Depending on that comparison, a pixel output is or is not provided to a subsequent layer of a larger neural network or to a data consumer.

15 Claims, 18 Drawing Sheets

(56) References Cited

OTHER PUBLICATIONS

"Understanding the Performance of Neuromorphic Event-based Vision Sensors", iniVation, May 2020, retrieved from https://inivation.com/wp-content/uploads/2020/05/White-Paper-May 2020.pdf, 20 pages.

Borji et al., "Salient Object Detection: A Survey," Computational Visual Media, vol. 5, No. 2, Jun. 2019, pp. 117-150.

Brändli, "Event-Based Machine Vision," A thesis submitted to attain the degree of Doctor of Sciences of ETH Zurich (Dr.sc.ETH Zurich), Diss. ETH No. 22500, 2015, 148 pages.

Chen et al., "MLP simlator (+NeuroSim) V3.0 Manual," Last Updated Aug. 21, 2021, retrieved from https://github.com/neurosim/MLP_NeuroSim_V3.0, 4 pages.

Chen et al., "NeuroSim: A Circuit-Level Macro Model for Benchmarking Neuro-Inspired Architectures in Online Learning," IEEE Transactions on Computer-Aided Design of Integrated Circuits and Systems, vol. 37, No. 12, Dec. 2018, pp. 3067-3080.

Dai et al., "Remotely Sensed Change Detection Based on Artificial Neural Networks," Photogrammetric Engineering & Remote Sensing, vol. 65, No. 10, Oct. 1999, pp. 1187-1194.

Forssell "Hardware Implementation of Artificial Neural Networks," Information Flow in Networks, vol. 18-859E, 2014, 4 pages.

Goi et al. "Perspective on photonic memristive neuromorphic computing," PhotoniX, vol. 1, No. 3, 2020, 26 pages.

Islam et al., "Multiwavelength Optoelectronic Synapse with 2D materials for Mixed-Color Pattern Recognition," ACS Nano, vol. 16, No. 7, May 25, 2022, pp. 10188-10198.

Islam et al., "Optoelectronic synapse using monolayer MoS2 field effect transistors," Scientific Reports, vol. 10, No. 21870, Dec. 14, 2020, 9 pages.

Krishnaprasad et al., "Electronic synapses with near-linear weight update using MoS2/graphene memristors," Applied Physics Letters, vol. 115, No. 103104, Sep. 6, 2019, 5 pages.

Lichsteiner et al., "A 128× 128 120 dB 15 μs latency asynchronous temporal contrast vision sensor," IEEE Journal of Solid State Circuits, vol. 43, No. 2, 2008, pp. 566-576.

Liu et al., "Multistage, Multimethod Approach for Automatic Detection and Classification of Epileptiform Eeg," IEEE Transactions on Biomedical Engineering, vol. 49, No. 12, Dec. 2002, pp. 1557-1566.

Martinez-Martinez et al., "Graphene-oxide interface for optoelectronic synapse application," Scientific Reports, vol. 12, No. 5880, 2022, 7 pages.

McLean, "Concurrent Learning Algorithm and the Importance Map," Advances in Information Security, vol. 55, 2014, pp. 239-250.

Park et al., "Electronic system with memristive synapses for pattern recognition," Scientific Reports, vol. 5, No. 10123, May 5, 2015, 9 pages.

Pradhan et al., "Ultrasensitive and ultrathin phototransistors and photonic synapses using perovskite quantum dots grown from graphene lattice," Science Advances, vol. 6, No. 7, Feb. 12, 2020, 11 pages.

Ronneberger et al., "U-Net: Convolutional Networks for Biomedical Image Segmentation," arXiv, vol. 1505.04597v1, May 18, 2015, 8 pages.

Voss, "The Third Wave of AI," Becoming Human; Artificial Intelligence Magazine, Sep. 24, 2017, retrieved from https://becominghuman.ai/the-third-wave-of-ai-1579ea97210b, 8 pages.

Yamkopcic et al., "Memristor-based neuron circuit and method for applying learning algorithm in SPICE," Electronics Letters, vol. 50, No. 7, Mar. 27, 2014, pp. 492-494.

\* cited by examiner

ARTIFICIAL INTELLIGENCE PIXEL SENSOR SYSTEMS AND METHODS

CROSS-REFERENCE TO RELATED APPLICATION

This application claims the benefit of U.S. Provisional Patent Application Ser. No. 63/299,117, filed Jan. 13, 2022, the entire disclosure of which is hereby incorporated herein by reference.

FIELD

The present disclosure relates to high speed, high saliency, event based sensing and imaging systems and methods.

BACKGROUND

Sensor systems are generating ever increasing amounts of data. For example, exquisite image sensors are currently available that generate so much data that transferring that data, much less analyzing it, challenges existing data architectures. For example, edge platforms, such as unmanned aerial systems (UAS), automobiles, and satellites, operating as sensor platforms, are capable of collecting large amounts of data including but not limited to full-motion video, space-based images and signals intelligence (SIGINT) waveforms. Once the data has been collected, processing, synthesizing, and disseminating any salient information within that data in a timely manner can be problematic. In particular, analysis of the data at centralized locations requires the transmission of large amounts of data to those locations. In addition, once transferred, analysis of the data by humans or computing facilities can be time consuming or impractical.

In order to analyze collected data for salient information in a timely manner, the use of Artificial intelligence (AI) systems has been proposed. However, systems based on the so-called $2^{nd}$ generation AI have not been capable of meeting current requirements for high speed (real-time), high saliency event-based sensing and imaging in edge platforms. For example, it's been estimated that Army counter-UAS sensors require 7 TeraFLOPS of camera level processing and Army/Navy/Air Force aided target recognition (AiTR) sensors require 330 TeraOps of deep learning processing to identify and recognize targets within mission time response windows. While such sensor systems can be built or developed, their size, weight and power (SWaP) are prohibitively large for edge platforms. Such AI sensors requiring trillions of operations per inference and ultra-large memory are typically implemented in the cloud with resulting time delay and energy consumption.

The problem to be addressed is not simply reducing or miniaturizing existing sensor systems. Fundamental deconstruction of the sensor pixel is required. For example, how it detects photons, converts them to salient digital signals matching changing target events while suppressing background at high speed must be re-invented. Current sensors consist of pixels that collect photoelectrons from all events (salient or not), and pass on the data to downstream processors for AI processing, recognition and classification. The tremendous data rate, computational operations and large memory cannot be used to implement highly efficient compact AI networks such as the recurrent neural net (RNN). As a result, high saliency imaging (i.e. imaging with true positives >90%) cannot be realized on edge platforms with current sensor pixels and neural networks.

Part of the solution is to reduce the pixel data by saliently detecting photocurrent changes due to events, i.e. by bringing AI processing to the pixel front end. Unfortunately, current sensor pixels are "dumb" detectors and summers of photocurrents and do not possess AI capabilities, preventing them from discriminating between event based photons and background photons.

SUMMARY

Embodiments of the present disclosure overcome these limitations by providing a unique and novel artificial intelligence pixel (aiPixel) capable of performing dot-matrix summation of photocurrents. This is unlike existing pixels, which perform an arithmetic sum of photocurrents. Dot-matrix computation is the key to AI processing, and the aiPixel disclosed herein therefore enables in-pixel AI and brings AI processing to the pixel front-end. Additionally, embodiments of the present disclosure provide the implementation of an innovative neural network, the aiPixel neural network (aiPNN) or pixel neural net (PNN), which combines three major components. First, a dot-matrix summation of sub-pixel photocurrents at the pixel level, which allows the arrays to be configured as adaptive multi-layer predictor neural networks (NN) for data reduction at the pixel, since optimal saliency is best achieved with adaptive weights. The second is a delta adaptation recurrent neural net (RNN) and the enabled algorithms that are capable of high data dimensionality reduction and low energy delay products. The third are the enabled algorithms, such as the delta adaptation algorithms, capable of $2^{nd}$ order backpropagation at the pixel level.

Embodiments of the present disclosure provide artificial intelligence pixels that are implemented as hardware components integrated into an intelligent sensor system, to provide a set of optical perceptrons. Each artificial intelligence pixel includes a plurality of sub-pixel elements. The sub-pixel elements can be disposed in a sub-array or area within a larger intelligent sensor array of the intelligent sensor system. Each sub-pixel element includes a photodetector and an integrated neuromorphic element, such as a memristor. The responsivity of the associated photodetector can be controlled or selectively weighted by varying the value of the neuromorphic element. The weighted outputs of each of the sub-pixel elements within an artificial intelligence pixel, which can be individually biased to produce a biased sub-pixel output, are summed at a summing node. The summed value can be biased, producing a biased output. That biased output is compared to a reference value. The value of each sub-pixel element's weight and bias amount, and the value of each artificial intelligence pixel's bias and reference value, can be set during a training process. Whether the artificial intelligence pixel produces an output in response to the summed and biased output depends on a comparison to the reference value. In at least some embodiments, if the summed and biased output is greater than the reference value, a pixel output is provided to a further layer or component of the intelligent sensor system.

Methods in accordance with embodiments of the present disclosure include implementing an optical perceptron in hardware by providing an array of photodetectors with integrated memristor elements. A responsivity of each sub-pixel element within a set of sub-pixel elements is selected, and outputs of the sub-pixel elements within the set are summed. The summed value is compared to a reference value. An artificial intelligence pixel output is provided in response to a first comparison result. In accordance with at least some embodiments of the present disclosure, no artificial intelligence pixel output is provided in response to a second comparison result. The responsivity of the sub-pixel elements and the reference value can be set during a training process.

Additional features and advantages of embodiments of the present disclosure will become more readily apparent from the following detailed description, particularly when taken together with the accompanying drawings.

DETAILED DESCRIPTION

Figure 1:
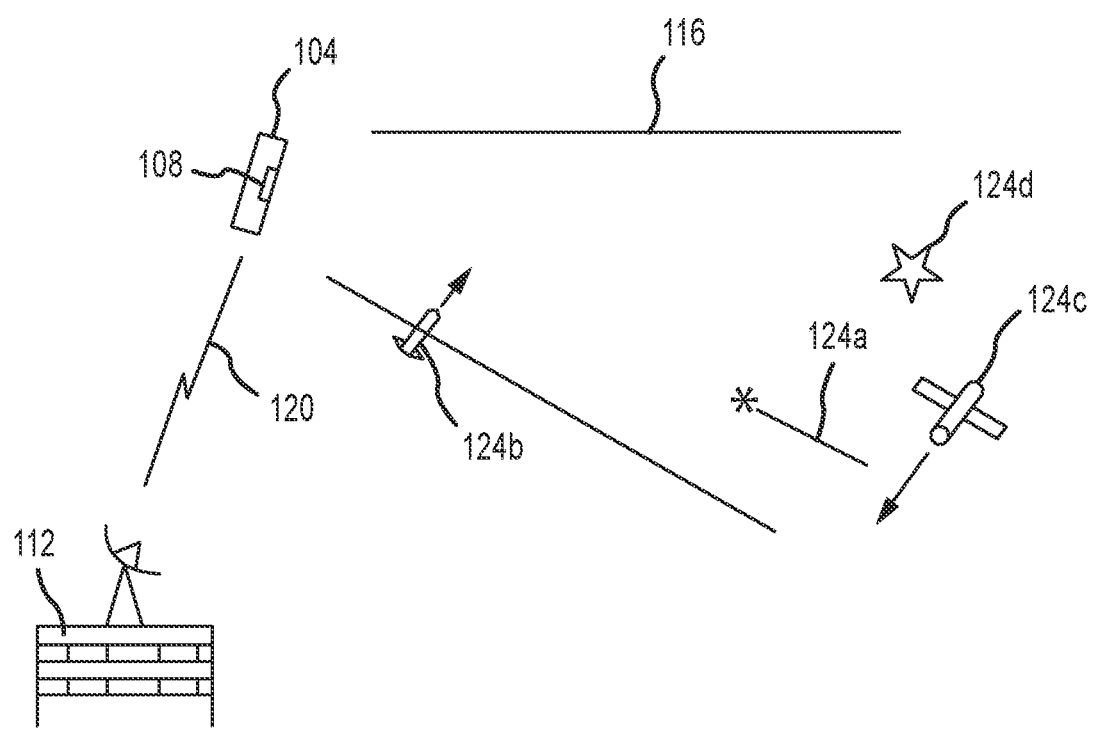
FIG. 1 depicts a sensor system in accordance with embodiments of the present disclosure in an exemplary operating environment.

FIG. 1 depicts a platform 104 carrying an intelligent sensor system 108 in accordance with embodiments of the present disclosure in an exemplary operating environment. In addition, the figure depicts a data consumer 112, to which the intelligent sensor system 108 can selectively provide data. As used herein, a platform 104 can include, but is not limited to, a satellite, a manned spacecraft, an interplanetary spacecraft, an interstellar spacecraft, an orbiter, a lander, a missile, an aircraft, an unmanned aerial vehicle, a balloon, a stratospheric balloon, a terrestrial vehicle, a ship, a tower, a tripod, an automated material or component handling apparatus, a robot, or any other mobile or stationary platform or device to which an intelligent sensor system 108 can be mounted. In accordance with embodiments of the present disclosure, the intelligent sensor system 108 collects and senses electromagnetic waves, such as but not limited to light or other radiation, from within a field of view 116.

As discussed herein, the intelligent sensor system 108 can be operated to collect image information, event information, or both image and event information, and to output that information to the data consumer 112 when the intelligent sensor system 108 deems the information to be salient to the data consumer 112. The data consumer 112 can be any intermediate or final consumer of data of the type collected and passed on by the intelligent sensor system 108. For example, where the platform 104 is a satellite and the intelligent sensor system 108 is deployed to detect events occurring within the field of view 116, data associated events that are deemed salient by the intelligent sensor system 108 can be transmitted to a data consumer 112 using a radio communication link 120. Human, machine, or both human and machine analysts at or associated with the data consumer 112 facility can then access and utilize the provided data. In addition, although shown in the example scenario as being a separate facility, a data consumer 112 can be carried by or fixed to the same platform 104 as the intelligent sensor system 108. In accordance with still other embodiments of the present disclosure, a data consumer 112 can be integral to the intelligent sensor system 108 itself.

In accordance with embodiments of the present disclosure, the intelligent sensor system 108 generates signals that are analyzed within the intelligent sensor system 108 to determine whether data based on such signals should be passed on to a data consumer 112. Objects or events 124 in the environment that are within a field of view 116 of the intelligent sensor system 108 can result in the generation of a signal. For example, where the intelligent sensor system 108 includes an array of photosensitive pixels, signals are generated in response to the receipt of photons by the photosensitive pixels. In accordance with embodiments of the present disclosure, signals are passed from the intelligent sensor system 108 where the signals are deemed salient to the operating parameters of the intelligent sensor system 108. For example, a signal can be output from the intelligent sensor system 108 in response to the detection of objects or events 124 within the field of view 116, including but not limited to the appearance of a pulse of light 124$a$, an arrival of an object 124$b$, a movement of an object 124$c$, or a change to the appearance of an object 124$d$ within the field of view 116.

As can be appreciated by one skilled in the art after consideration of the present disclosure, depending on the function or functions of the intelligent sensor system 108, not all signals generated within the intelligent sensor system 108 may be relevant. For example, for an intelligent sensor system 108 implementing a collision avoidance function, an object 124 moving with the intelligent sensor system 108 platform 104 and/or relative to the surrounding environment may be of interest, while an object 124 that is fixed relative to the surrounding environment may not be of interest. Moreover, data collected by the intelligent sensor system 108 from the environment itself may be of little or no interest. Accordingly, embodiments of the present disclosure selectively propagate information collected by the intelligent sensor system 108 to data consumers 112.

Figure 2:
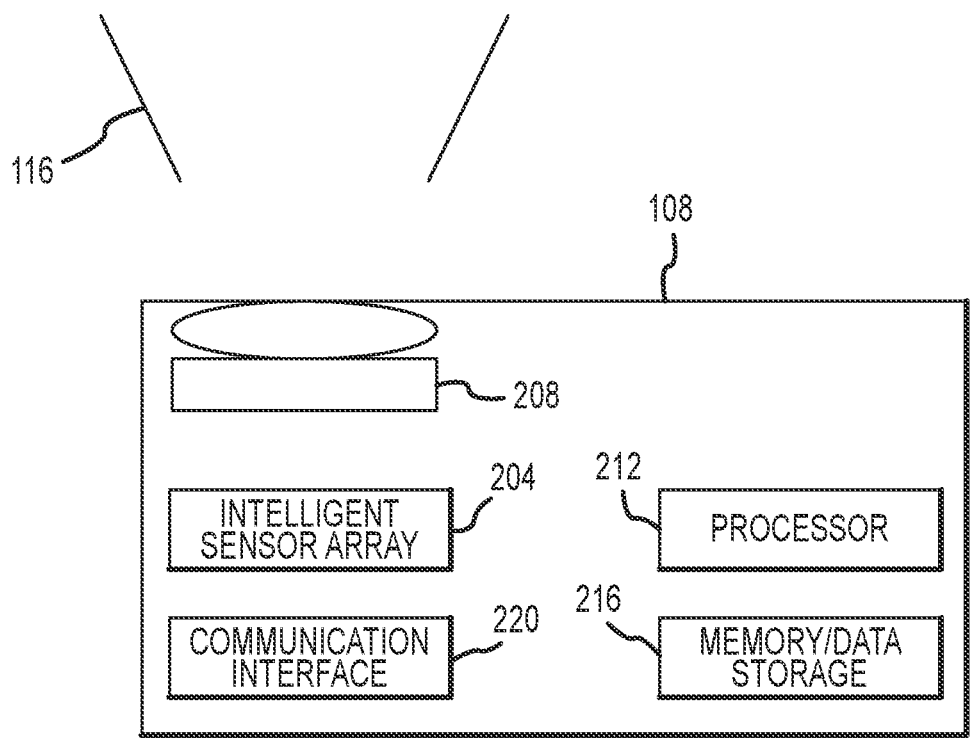
FIG. 2 is a block diagram depicting components of a sensor system having a sensor element incorporating an intelligent sensor array having artificial intelligence pixels in accordance with embodiments of the present disclosure.

FIG. 2 depicts components of an intelligent sensor system 108 in accordance with embodiments of the present disclosure. As shown, the intelligent sensor system 108 generally includes an intelligent sensor array 204, an optical assembly 208, a processor 212, memory or data storage 216, and a communication interface 220. The optical assembly 208 collects light from within the field of view 116 of the intelligent sensor system 108, and directs that light to a light incident surface of the intelligent sensor array 204. The processor 212 can include a general purpose programmable processor, a graphics processing unit, a field programmable gate array, a controller, or other processing device or set of devices capable of executing instructions for the operation and control of the intelligent sensor system 108. The instructions executed by the processor 212, data output from the intelligent sensor array 204, and the like can be stored in the memory or data storage 216. The memory or data storage 216 can include one or more volatile or nonvolatile solid-state-state memory devices, such as but not limited to random access memory (RAM), synchronous dynamic RAM (SDRAM), or the like, and/or one or more mass storage devices, such as, but not limited to, hard disk drives, optical storage devices, solid-state drives, or the like. The instructions stored in the memory or data storage 216 can include application programming for operating the intelligent sensor array 204. In addition, the memory or data storage 216 can include application programming for formatting or otherwise operating on output generated or produced by the intelligent sensor array 204. In accordance with still further embodiments, data obtained from the intelligent sensor array 204 can be communicated to other systems or devices, including but not limited to one or more data consumers 112, in raw or processed form, through the communication interface 220.

Figure 3:
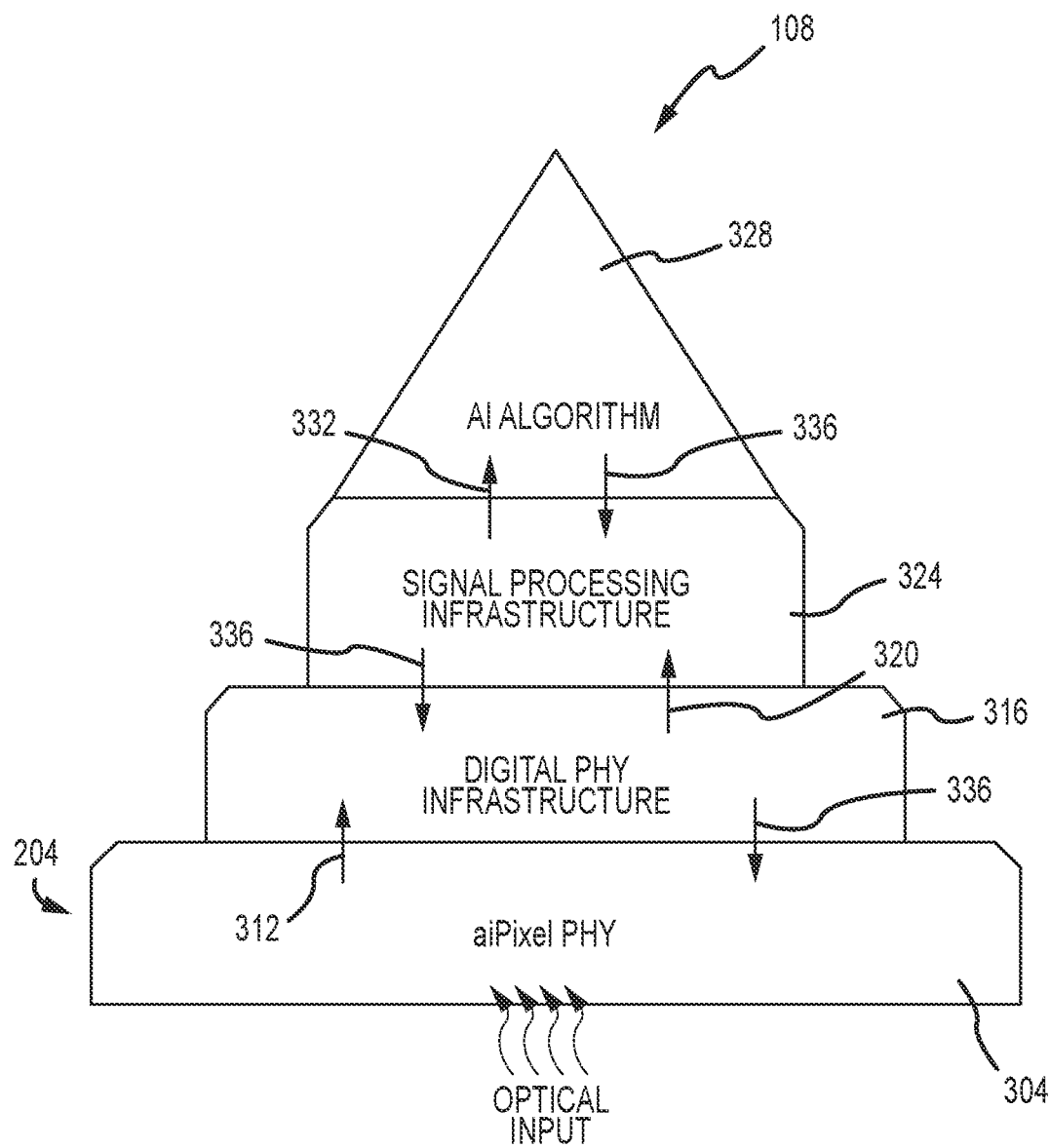
FIG. 3 is a functional layer depiction of a sensor system incorporating an intelligent sensor array in accordance with embodiments of the present disclosure.

FIG. 3 is a layered functional depiction of an intelligent sensor system 108 incorporating an intelligent sensor array 204 in accordance with embodiments of the present disclosure. A first or artificial intelligence pixel functional layer 304, physically implemented as part of the intelligent sensor array 204 and providing a plurality of optical perceptrons, generates electrical signals (or not) on a per pixel basis in response to the receipt of an optical input 308. Moreover, as discussed in greater detail elsewhere herein, the artificial intelligence pixel functional layer 304 is selective in the pixel signals that are provided as a pixel signal output 312 from the artificial intelligence pixel functional layer 304 to a successive layer. In particular, only signals that are deemed by the intelligent sensor system 108 to be salient to the operation or goals of the intelligent sensor system 108 are provided as part of the pixel signal output 312. The identification of salient signals is a function of the implementation by the intelligent sensor system 108 of a feed forward predictor neural network, with backpropagation, which can be configured as a multilayer perceptron, as a convolutional neural network, or as a deep neural network.

Next is a digital physical infrastructure functional layer 316. The digital physical infrastructure functional layer 316 formats the pixel signal output 312 received from the artificial intelligence pixel functional layer 304. The digital physical infrastructure functional layer 316 then provides a digital pixel signal output 320 to the successive layer. In accordance with embodiments of the present disclosure, the digital physical infrastructure layer 316 can be physically implemented as a chip or set of semiconductor layers and included devices that are laminated to or that are otherwise integrated with the intelligent sensor array 204.

The digital pixel signal output 320 can be passed to a signal processing infrastructure functional layer 324. The signal processing infrastructure functional layer 324 can operate to further process and format the digital pixel signal output, for example to package or otherwise format the digital pixel signal output 320 for storage in the memory or data storage 216, for transmission to a consumer or intermediate system via the communication interface 220, or for other purposes. In addition, the signal processing infrastructure functional layer 324 can perform functions in support of the operation of a backend artificial intelligence algorithm functional layer 328. In accordance with embodiments of the present disclosure, the artificial intelligence algorithm functional layer 328 can implement a recurrent neural network (RNN). For example, the signal processing infrastructure functional layer can provide the digital pixel signal output 320 to the artificial intelligence functional layer 328. As a further example, the signal processing infrastructure functional layer 324 can provide training data to the artificial intelligence functional layer 328 As also depicted in FIG. 3, the various layers can provide control or feedback signals 336 to lower layers. In particular, the artificial intelligence functional layer 328 can provide control signals 336 in the form of updated weights that are propagated back through the intermediate layers to the artificial intelligence pixel functional layer 304, where the updates are implemented.

Figure 4:
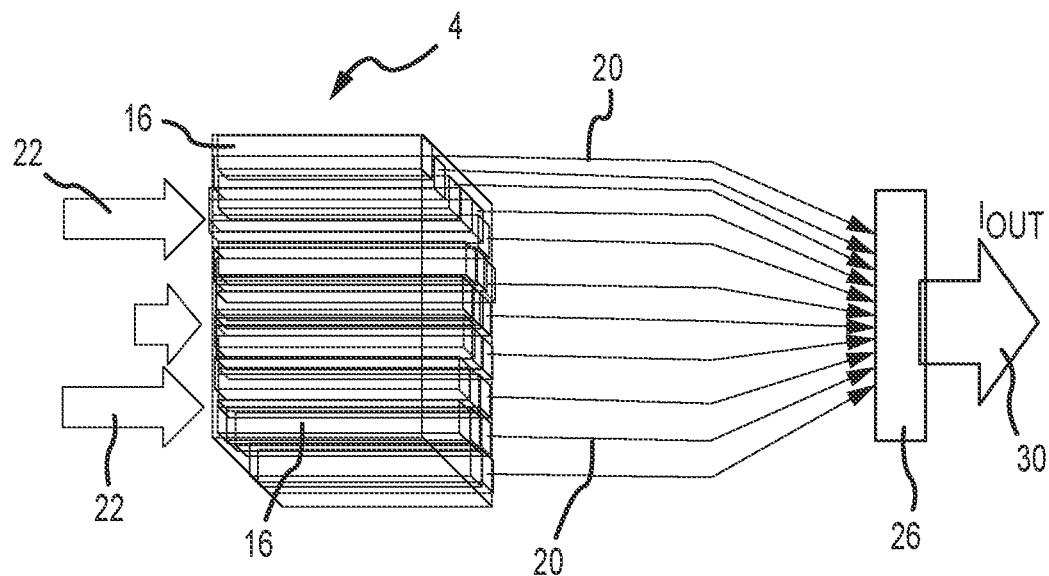
FIG. 4 depicts aspects of a prior art pixel having an output signal equal to a sum of a plurality of sub-pixel outputs.

In a conventional image sensor, photodetectors are disposed in an array, with each photodetector typically comprising a "pixel". As depicted in FIG. 4, a prior art pixel 4 can also include a plurality of sub-pixels 16. In this example, each sub-pixel is configured as a photodetector. Each of the sub-pixels 16 generates an output 20 in the form of a current that is provided to a summing electrode 26. The output 20 of any individual sub-pixel 16 is a function of the responsivity of the sub-pixel and the optical input power 22 at that sub-pixel, as follows:

$$i_{m i_i} = R P_{i,m}$$

where R is the responsivity of sub-pixel m, and where P is the input optical power at sub-pixel 16 $m$. The output 30 of the pixel 4 is a simple arithmetic sum of all of the individual sub-pixel 16 outputs 20, and is given by:

$$i_{out} = \Sigma R P_{i,m}$$

Figure 5:
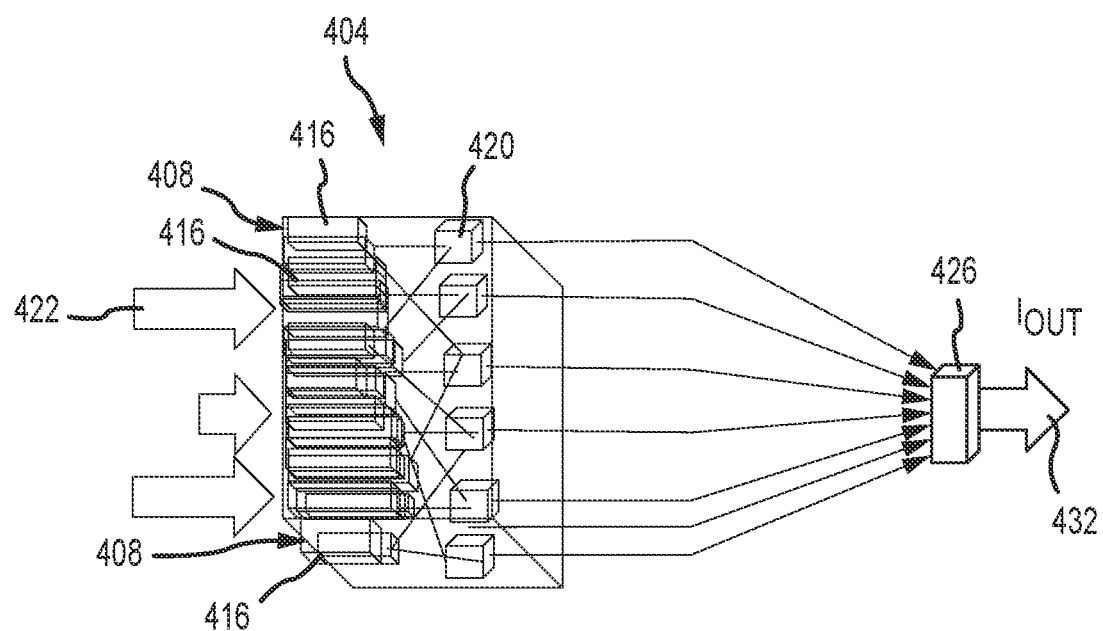
FIG. 5 depicts aspects of a pixel in accordance with embodiments of the present disclosure in which dot-matrix computation is performed at the pixel level.
Figure 6:
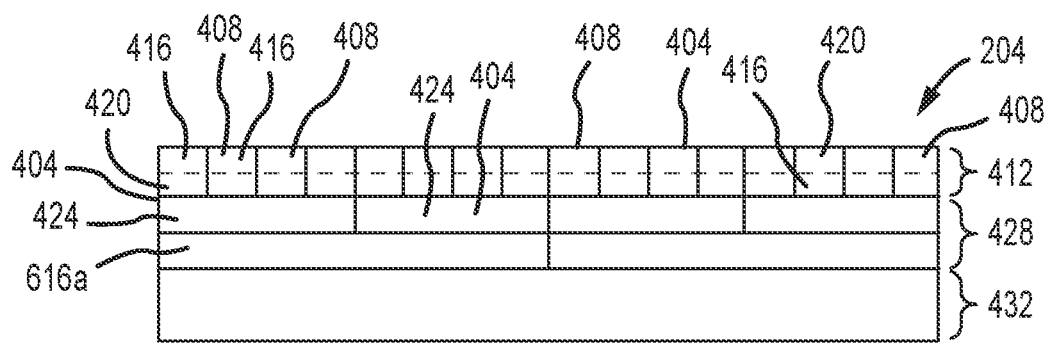
FIG. 6 is a cross-section in elevation of an intelligent sensor array incorporating artificial intelligence pixels in accordance with embodiments of the present disclosure.
Figure 7A:
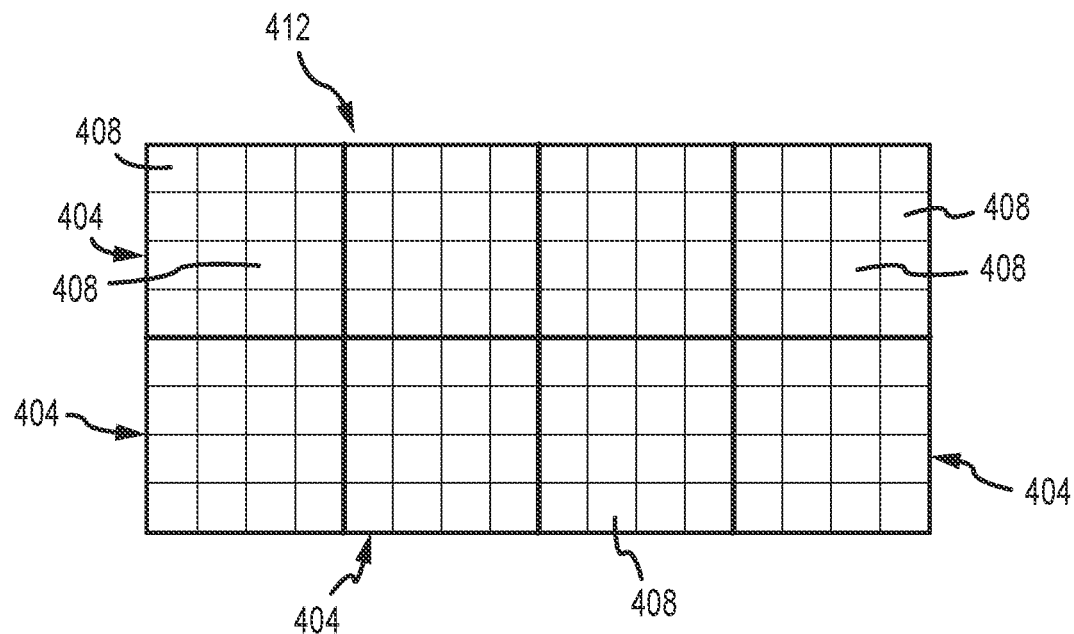
FIGS. 7A-7D are top plan views of layers of an intelligent sensor array incorporating artificial intelligence pixels in accordance with embodiments of the present disclosure.
Figure 7B:
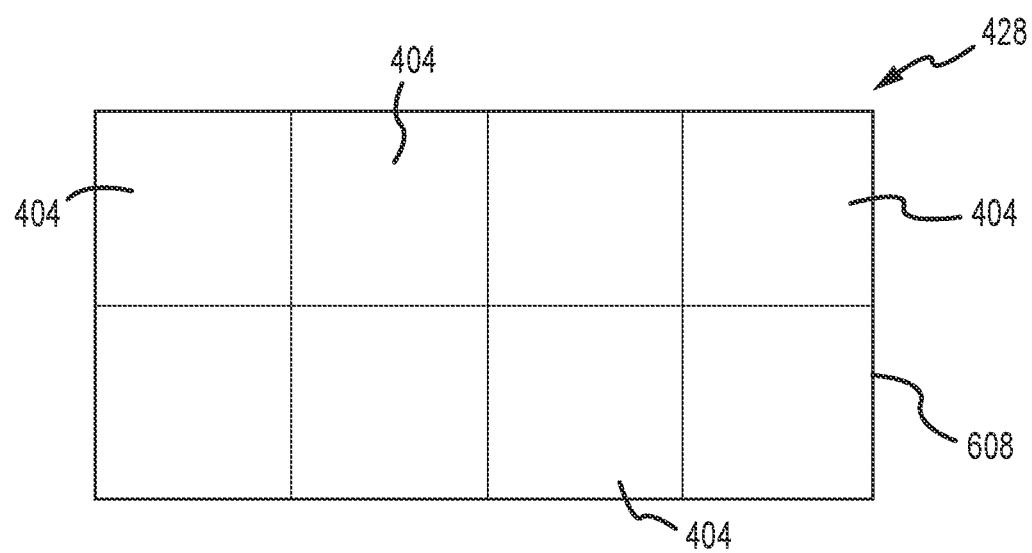
Figure 7C:
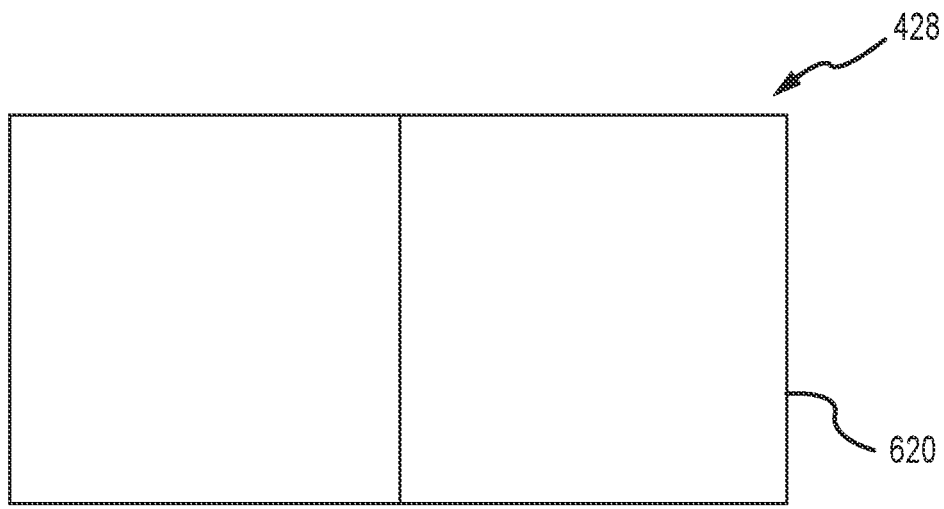
Figure 7D:

In accordance with embodiments of the present disclosure, an intelligent sensor array 204 is provided that includes a plurality of artificial intelligence pixels 404. As depicted in FIG. 5, each artificial intelligence pixel 404 as disclosed herein includes a set or sub-array of optical perceptrons or sub-pixel elements 408. The sub-pixel elements 408 integrate a plurality of photodetectors 416, a plurality of neuromorphic elements 420, and a summing electrode 426. In accordance with embodiments of the present disclosure, a neuromorphic element 420 can include a material posing neuromorphic properties, such as potentiation: long term add to memory; depression: long term read from memory; long short term memory (LSTM); or spike timing dependent plasticity.

The detection principle of the artificial intelligence pixel 404 in accordance with embodiments of the present disclosure is governed by the following equation:

$$i_{out} = R\Sigma(w_{i,mLTP} + w_{i,mLTD})P_{i,m}$$

where $w_{i,mLTP} = a_P \exp(b_P t)$, and $w_{i,mtLTD} = a_D \exp(b_D t)$ are the weights whose characteristics derive from solutions of the membrane equation governing the current-voltage characteristics of the underlying neuromorphic elements 420, with LTP referring to potentiation of the related weight, and LTD referring to depression of the related weight. R is the responsivity of each photodetector 416, and P is the power of the optical input 422. Accordingly, the output of an artificial intelligence pixel 404 in accordance with embodiments of the present disclosure is the weighted sum of the photocurrents in the subpixels and enables the artificial intelligence pixel 404 to perform dot matrix computation via vector matrix multiplication (VMM). An appropriate configuration of sub-pixel elements 408 and in particular of included neuromorphic elements 420 can be architected to form multi-layer perceptron (MLP) and/or convolutional neural network (CNN) and deep neural network (DNN) meshes and arrays to implement a variety of neural networks and sensors.

With reference now to FIGS. 6 and 7A-7D, the sub-pixel elements 408 are disposed in a detection and weighting layer 412. The photodetectors 416 of the sub-pixel elements 408 occupy all or portions of a light incident surface side of the intelligent sensor array 204. In accordance with at least some embodiments of the present disclosure, the photodetectors 416 of any one artificial intelligence pixel 404 occupy a contiguous sub-area of the light incident surface side of the intelligent sensor array 204. As previously noted, in addition to a photodetector 416, each sub-pixel element 408 includes a neuromorphic element 420. Examples of suitable photodetector elements 416 include, but are not limited to, photodiodes, bolometers, microbolometers, phototransistors, photoconductors, or any other device capable of producing an electrical current in response to incident electromagnetic radiation. Examples of suitable neuromorphic elements 420 include, but are not limited to, memristors, memcapacitors, or meminductors. In accordance with embodiments of the present disclosure, and as discussed in greater detail elsewhere herein, the photodetector 416 of a sub-pixel element 408 is integrated with the neuromorphic element 420 of that sub-pixel element 408. The output of a sub-pixel element 408 is a weighted version of the photocurrent generated in response to exposure of the photodetector 416 of the sub-pixel element 408 to a received optical signal. More particularly, the responsivity of the sub-pixel element 408 (i.e. the applied weight) to a given quantum of incident light, is varied by varying the value of the integrated neuromorphic element 420.

In addition to a plurality of sub-pixel elements 408, each artificial intelligence pixel 404 also includes a summation and data reduction element 424. The summation and data reduction element can be disposed in a summation and data reduction layer 428. As an example, but without limitation, the summation and data reduction element 424 can include a summing electrode 426. In operation, for each artificial intelligence pixel 404, the included summation and data reduction element 424 performs a dot-matrix summation of the outputs from all of the sub-pixel elements 408 within that artificial intelligence pixel 404, to obtain a pixel signal for that artificial intelligence pixel 404. As part of the dot matrix summation, a bias value can be applied. The obtained pixel signal value is then compared in the artificial intelligence pixel 404 to a selected threshold value. As an example, the threshold value can be a previous pixel signal value, a previous analog pixel signal value output 312, a value provided by the artificial intelligence functional layer 328, or a value provided from some other source. Depending on a comparison of the obtained analog pixel value to the threshold value, the obtained pixel value may be passed on (or not) to a next layer.

Figure 8:
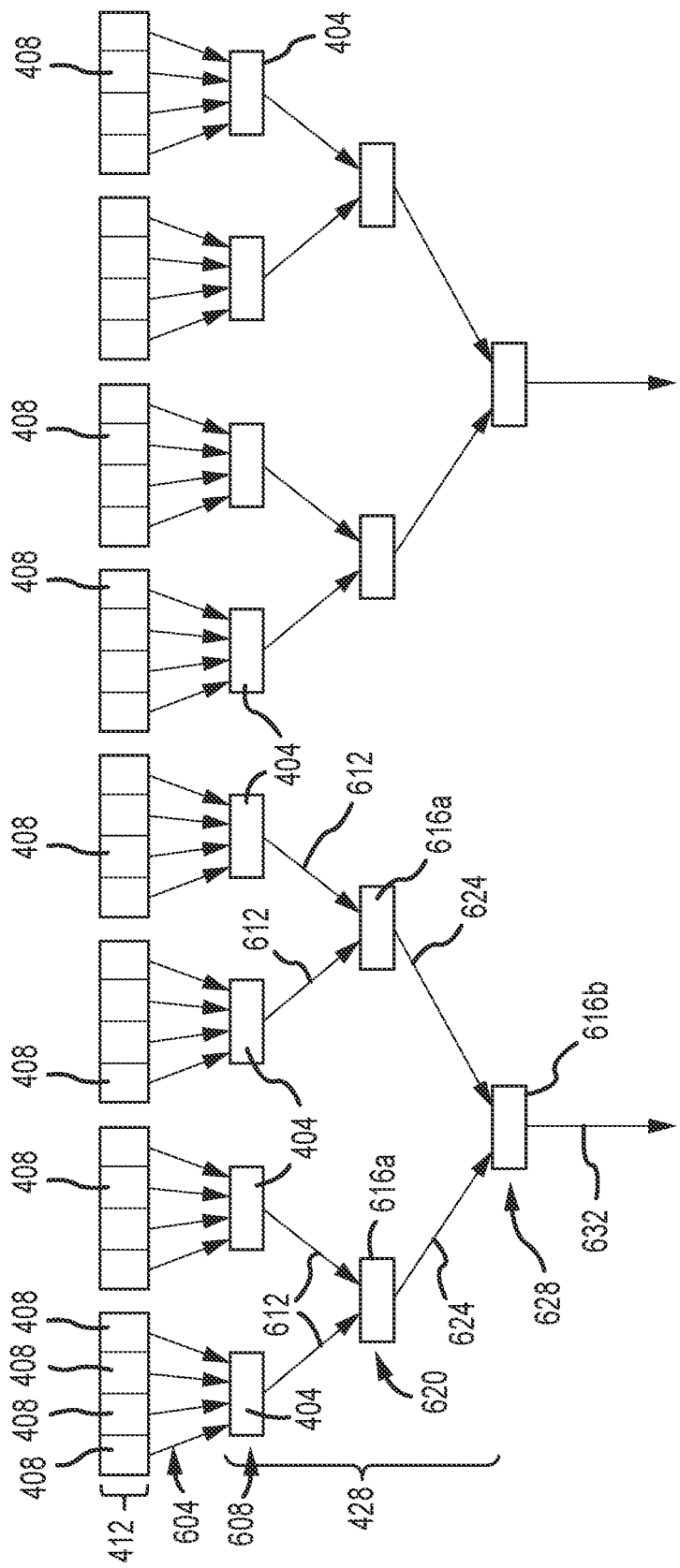
FIG. 8 depicts a logical arrangement of sub-pixel elements and higher level pixels of an intelligent sensor array incorporating artificial intelligence pixels in accordance with embodiments of the present disclosure.

In accordance with embodiments of the present disclosure, and as depicted in FIG. 8, multiple layers or steps of dot-matrix summation and comparison to a threshold can be implemented in the summation and data reduction layer 428. In particular, sets of weighted outputs 604 from sub-pixel elements 408, grouped into sets of two or more sub-pixel elements 408, can be processed through a step of dot-matrix summation and comparison in artificial intelligence pixels 404 included in a first layer 608 of the summation and data reduction layer 428, and an artificial intelligence pixel signal value 312 can be provided as an aggregated artificial intelligence pixel output 612 (or not) from those artificial intelligence pixels 404. The aggregated artificial intelligence pixel outputs 612 from selected sets of artificial intelligence pixels 404 can then be processed through a step of dot-matrix summation and comparison in aggregated summation and data reduction blocks 616a included in a second layer 620 of the summation and data reduction layer 428, and a further aggregated pixel output 624 can be provided (or not) from those aggregated summation and data reduction blocks 616a. The further aggregated pixel outputs 624 from selected sets of the summation and data reduction blocks 616a can then be processed through a step of dot-matrix summation and comparison in further aggregated summation and data reduction blocks 616b in a third layer 628 of the summation and data reduction layer 428, and a still further aggregated pixel output 632 can be provided. This process can be continued for as many layers as desired. In accordance with at least some embodiments of the present disclosure, the data aggregation steps at successive levels correspond to larger and larger areas of the intelligent sensor array 204.

With reference again to FIGS. 6 and 7A-7D, the output from the summation and data reduction layer 428 can be provided to a digital physical infrastructure circuit 432 as one or more pixel signal value outputs 312 (or one or more aggregated pixel outputs 612, 624, or 632). The digital physical infrastructure circuit 432, including the set of pixel signal value outputs of the digital physical infrastructure layer 316, can be implemented as additional layers of a semiconductor element implementing the detection and summation and data reduction layers 428, or as one or more semiconductor packages included as part of or integrated with the summation and data reduction layer 428 and in turn with the detection and weighting layer 412.

Figure 9A:
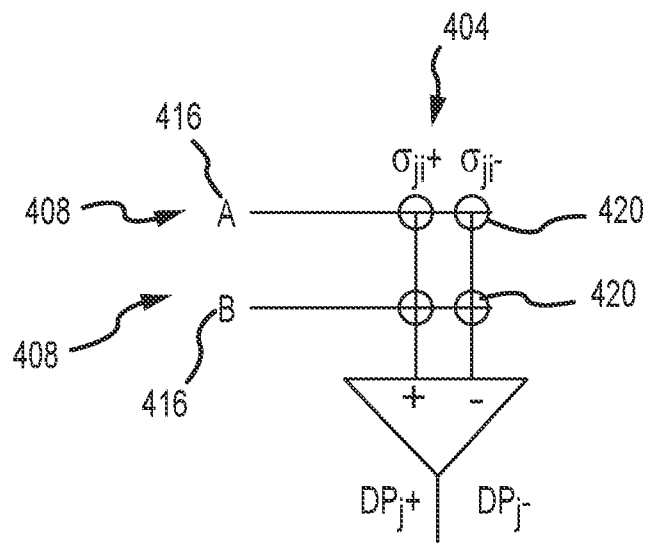
FIG. 9A is an array schematic representation of an artificial intelligence pixel in accordance with embodiments of the present disclosure.
Figure 9B:
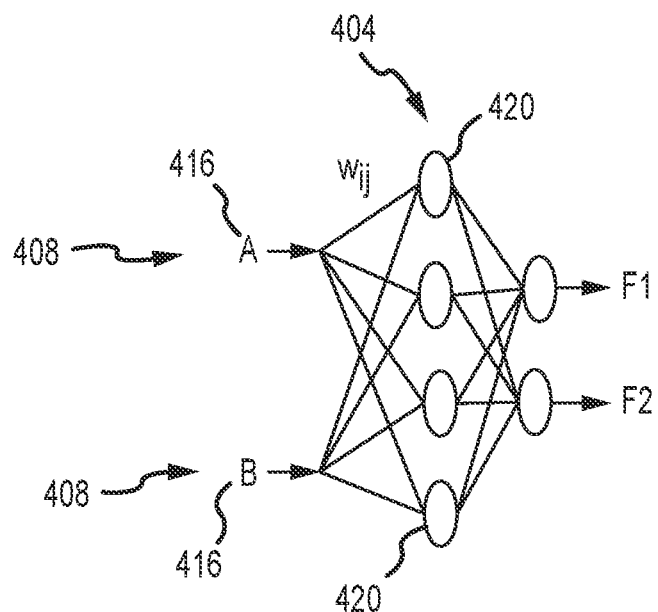
FIG. 9B is a neural network representation of an artificial intelligence pixel included as a component of an artificial intelligence sensor in accordance with the embodiments of the present disclosure.

FIG. 9A is a schematic view of elements an artificial intelligence pixel 404 and FIG. 9B is a neural network representation of the artificial intelligence pixel 404 in accordance with embodiments of the present disclosure, with time varying voltage responsivity corresponding to weights $\sigma_{ji}^+$ and $\sigma_{ji}^-$ applied by the neuromorphic elements 420 to generate comparator dot product outputs $DP_i^+$ and $DP_i^-$. In this example, the artificial intelligence pixel 404 includes first and second sub-pixel elements 408. Each sub-pixel element 408 includes a photodetector 416 and a neuromorphic element 420.

Figure 10A:
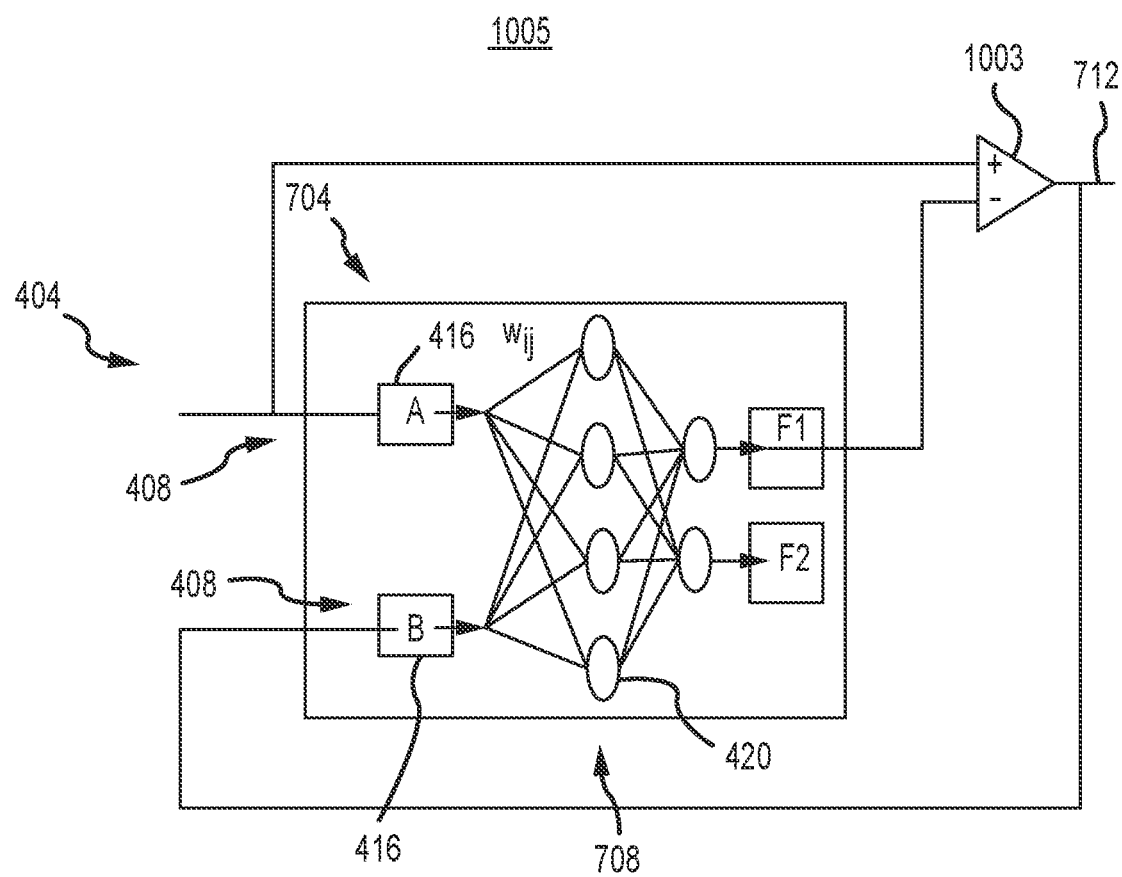
FIG. 10A depicts a neural network implemented by an artificial intelligence pixel of an intelligent sensor array in accordance with embodiments of the present disclosure.

FIG. 10A is a neural network representation of an artificial intelligence pixel 404 in accordance with embodiments of the present disclosure. In this example, the artificial intelligence pixel 404 includes an input layer 704, a hidden layer 708, and an output layer 712. The input layer 704 of the single pixel neural network is made up of a plurality of sub-pixel elements 408. In particular, the photodetectors 416 of the sub-pixels 408 included in the artificial intelligence pixel 404 produce an output in response to an optical input. The output of each sub-pixel element's 408 photodetector 416 is modified by an adjustable weight, in the form of the neuromorphic element 420 included in each sub-pixel element 408. The adjustable weights, together with selectable biases and a summing node form the hidden layer 708. The output layer 712 includes a comparator 1003 associated with a reference value. The neural network 1005 thus formed by the artificial intelligence pixel 404 can be configured as an artificial intelligence pixel that implements a feed forward network with back propagation. The artificial intelligence computation capability of the artificial intelligence pixel 404 is enabled by the adjustable weights, biases, and reference value of the artificial intelligence pixel 404.

Figure 10B:
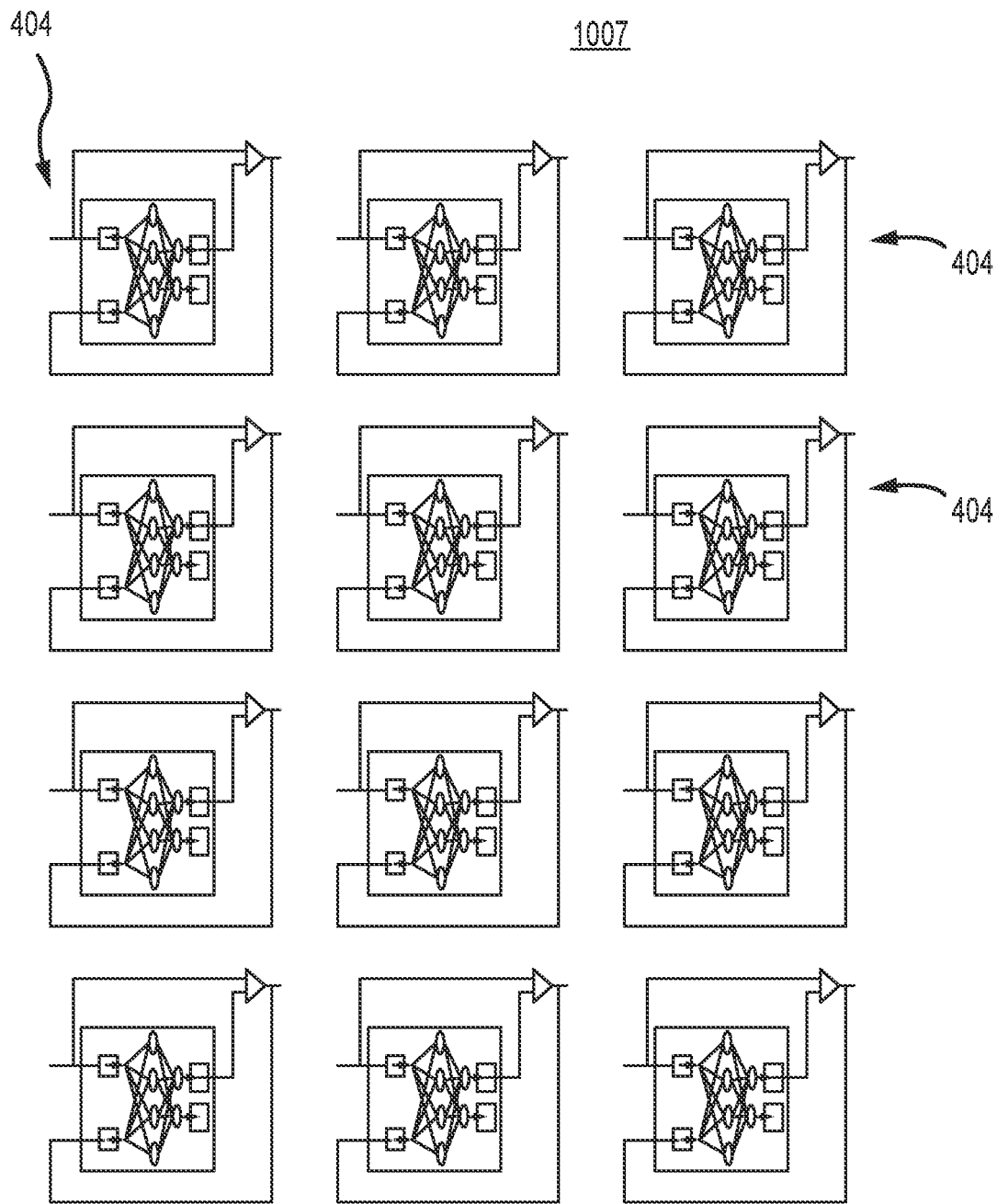
FIG. 10B depicts an array of artificial intelligence pixels in accordance with embodiments of the present disclosure.
Figure 10C:
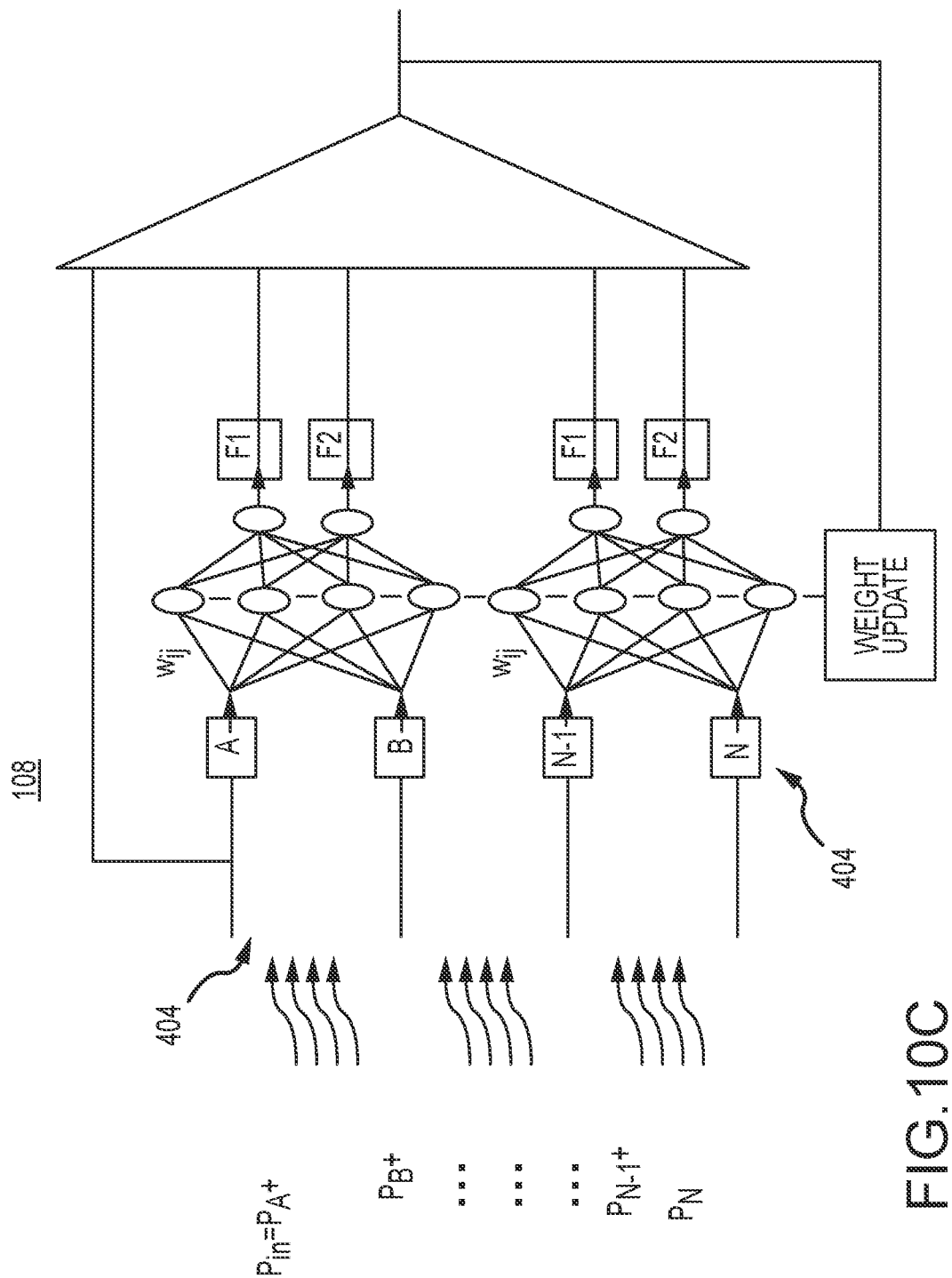
FIG. 10C depicts a neural network implemented by a plurality of artificial intelligence pixels and that can be incorporated into an adaptive feedforward with backpropagation predictor sensor in accordance with embodiments of the present disclosure.

FIG. 10B shows a neural network array 1007, in which a plurality of artificial intelligence pixels 404 in accordance with embodiments of the present disclosure are disposed as a full programmable array that can be connected as required by the application. FIG. 10C further depicts a specific embodiment of the artificial intelligence sensor 108 with bespoke connections between included artificial intelligence pixels 404 for implementing an adaptive feedforward with back propagation predictor sensor for data reduction and/or background suppression. In accordance with at least some embodiments of the present disclosure, the driving algorithm for the sensor 108 is a delta adaptation algorithm that performs feedforward estimation while dynamically adjusting the weights based on estimation errors.

Figure 11A:
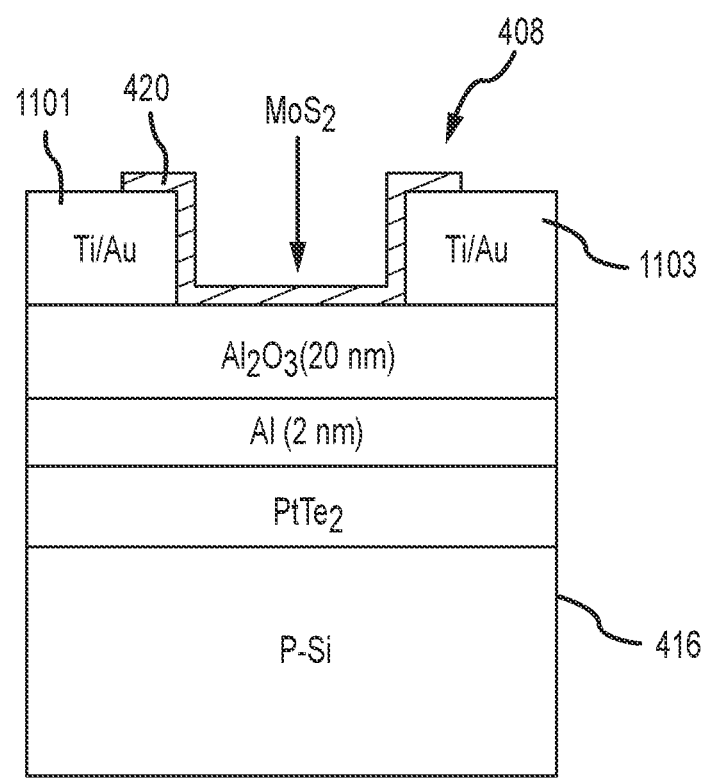
FIG. 11A is a cross-section in elevation of a sub-pixel element as reported in the prior art.

FIG. 11A depicts an example of a sub-pixel element 408 that can be included in an artificial intelligence pixel 404 in accordance with embodiments of the present disclosure. As shown in this example, the sub-pixel element 408 can be provided as an optical perceptron in which a photodetector 416 is integrated with a neuromorphic element 420. More particular, the example illustrated in FIG. 11A includes a cross-sectional depiction of an optical perceptron or sub-pixel element 408 in which the neuromorphic element 420 is configured as a memristor that enables a responsivity of the photodetector 416 to be varied. As an example, but without limitation, a sub-pixel element 408 so configured and suitable for inclusion in an artificial intelligence pixel 404 as disclosed herein can be in the form of the optical synapse as taught by M. M. Islam et al. ("Optoelectronic synapse using monolayer MoS2 field effect transistors", Islam, M. M.; Dev, D.; Krishnaprasad, A.; Tetard, L.; Roy, T., *Scientific Reports* 2020, 10 (1), 21870), the disclosure of which is hereby incorporated herein in its entirety. As shown, the sub-pixel element 408 can include a photodetector element 416 configured as a conventional photodiode, which generates charge in response to an optical input. Each sub-pixel element 408 generally includes a source 1101, a drain 1103, and a gate, provided as a neuromorphic element 420. The sub-pixel element 408 in this example includes a neuromorphic element 420 in the form of a molybdenum disulphide ($MoS_2$) memristor integrated with the photodetector element 416, which functions as an adjustable weight.

In particular, by adjusting the weight, the responsivity of the sub-pixel element 408 to incident light can be varied. In addition to molybdenum disulphide, other examples of memristor materials include hafnium oxide, titanium oxide, and the like. In accordance with embodiments of the present disclosure, the value of the neuromorphic element 420 (in this example the memresistance or weight) is set during a training process. The sub-pixel element 408 can feature time-dependent responsivity, long term potentiation or depression to enable a weight value to be stored and selectively updated, enabling machine learning features when combined in an artificial intelligence pixel 404 in accordance with embodiments of the present disclosure. The value of the neuromorphic element 420 (memristor or other types of artificial neurons and synapses) can be varied by, for example, providing an optical pulse or a drain pulse for implementing a potentiated weight update, or providing a gate pulse for implementing a depressed weight update.

Figure 11B:
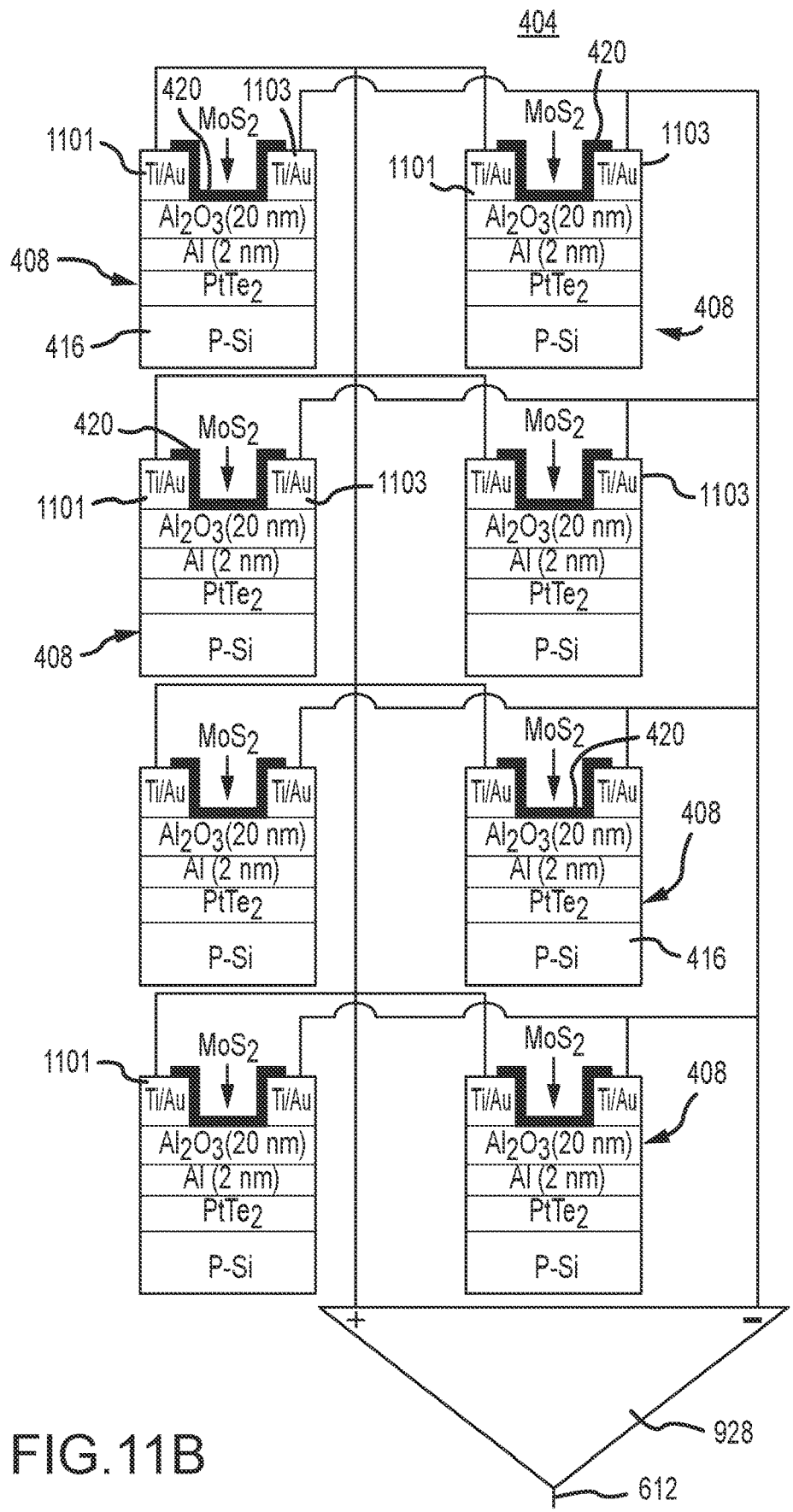
FIG. 11B depicts a network of sub-pixel elements disposed in a novel configuration to create a artificial intelligence pixel in accordance with embodiments of the present disclosure.

FIG. 11B shows an example of a hardware realization of a network of sub-pixel elements 408 disposed to create the artificial intelligence pixel 404 in accordance with embodiments of the present disclosure. The sub-pixel elements 408 in the network can be connected as a crossbar array, pseudo-crossbar or memory array. Each subpixel element 408 includes a neuromorphic element 420. By controlling the values of the neuromorphic elements 420 within the artificial intelligence pixel 404, training, weight setting, storage, and update operations, which can mimic biological neurons and synapses, can be implemented. In this example, the sources 1101 of each of the sub-pixel elements 408 are connected to one another and to a first input of a comparator 928, and the drains 1103 of each of the sub-pixel elements 408 are connected to one another and to a second input of the comparator 1105. The resulting pixel 404 implements in hardware the ability to detect optical inputs, and further to process the inputs to produce an output 612 only in selected instances.

Figure 12A:
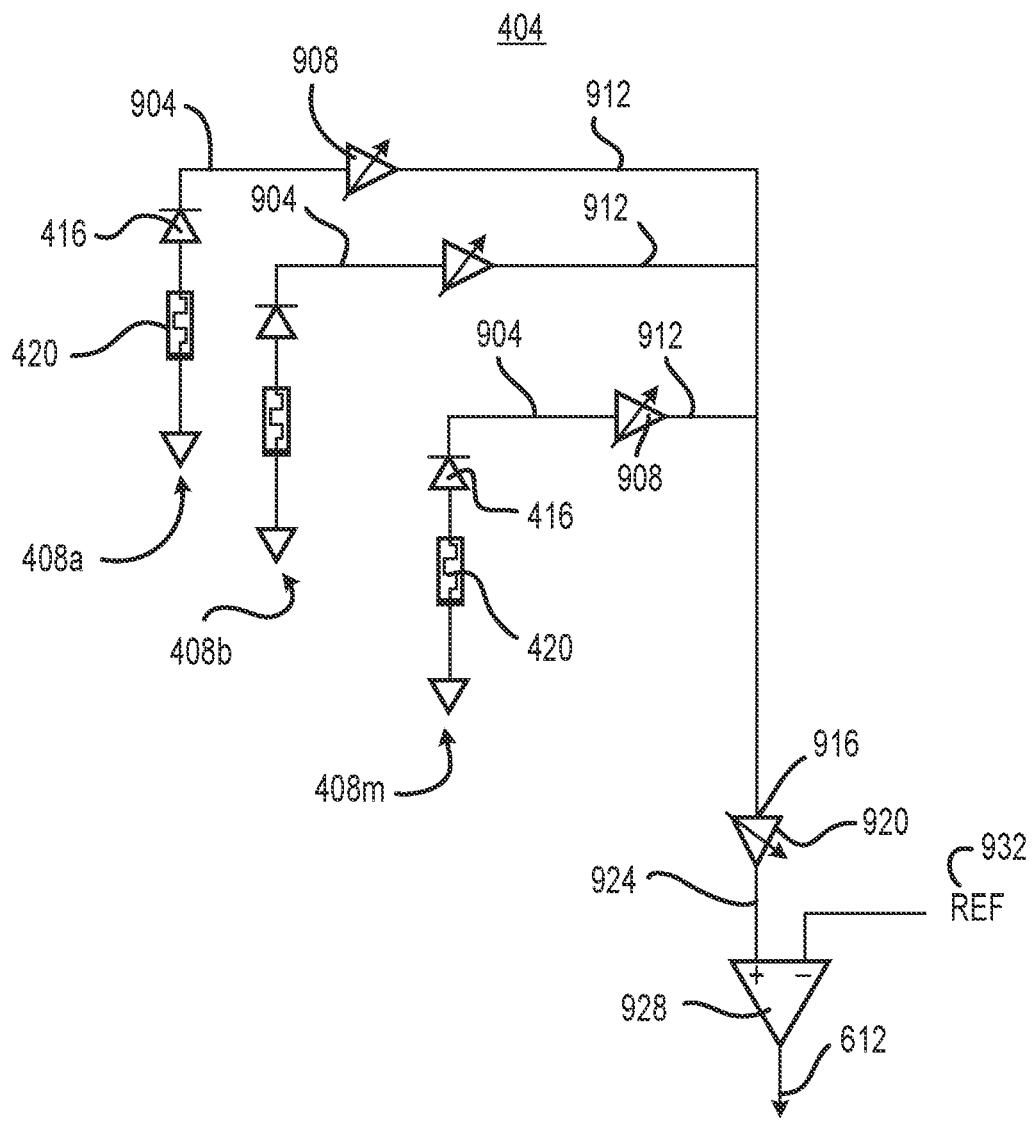
FIGS. 12A-12C depict variants of a circuit implementing an artificial intelligence pixel in accordance with embodiments of the present disclosure.
Figure 12B:
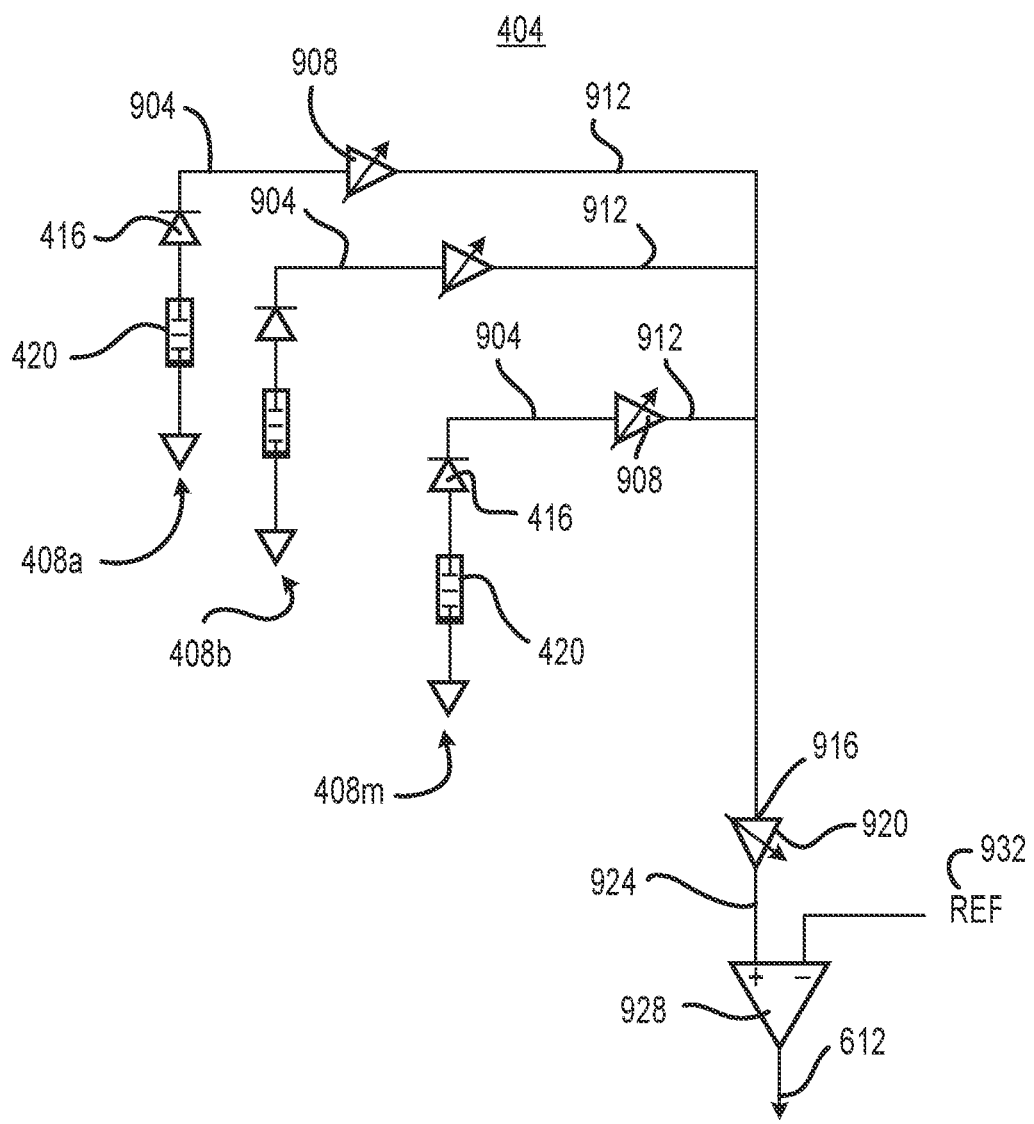
Figure 12C:
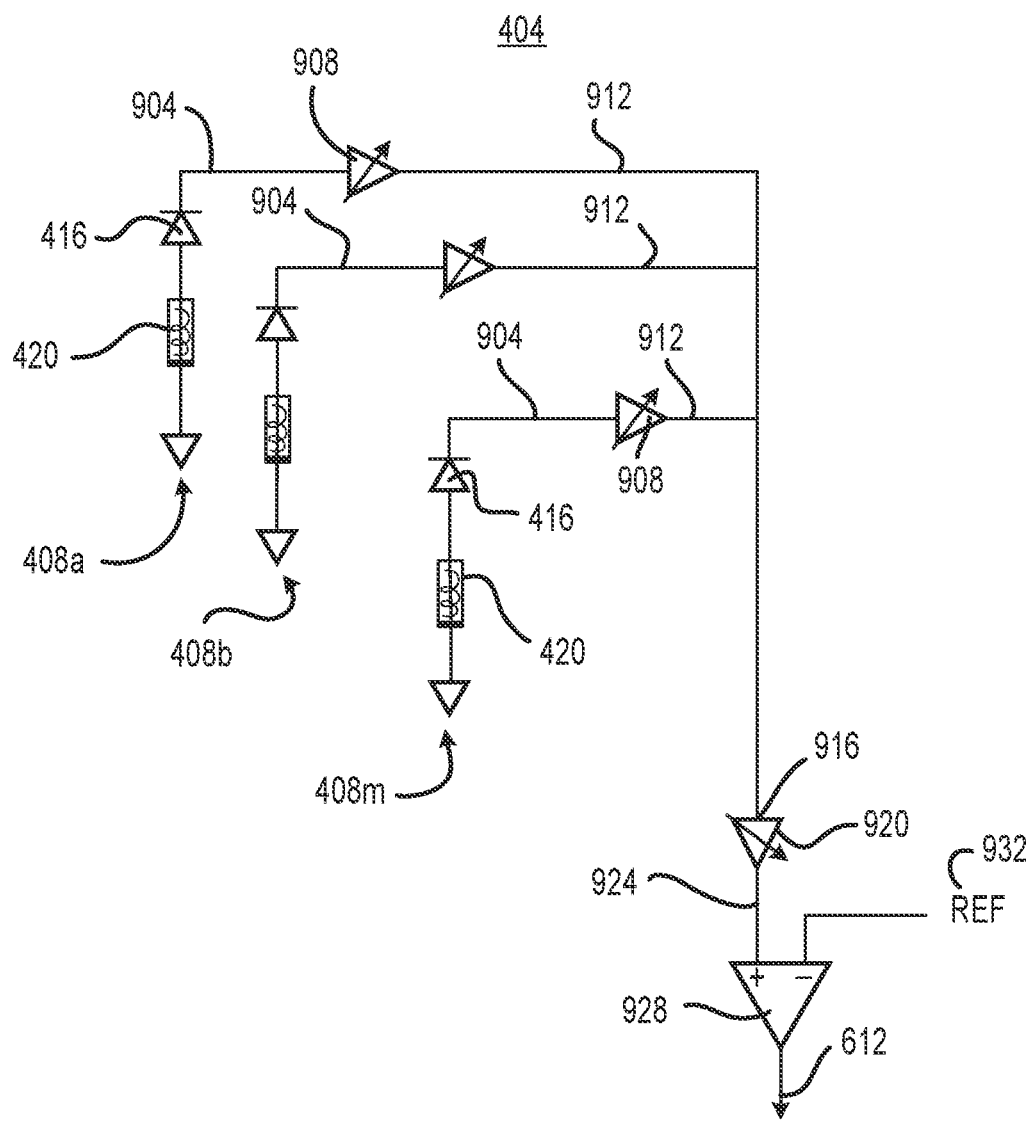

FIGS. 12A-12C provide circuit schematic representations of an artificial intelligence pixel 404 of an intelligent sensor array 204 in accordance with embodiments of the present disclosure. FIGS. 12A-12C are identical to one another, except that in FIG. 12A the neuromorphic element 420 included in each of the sub-pixels 408 is a memristor, in FIG. 12B the neuromorphic element 420 included in each of the sub-pixels 408 is a memcapacitor, and in FIG. 12C the neuromorphic element 420 included in each of the sub-pixels 408 is a meminductor. As shown, several sub-pixel elements 408a-408m are included in the artificial intelligence pixel 404. Each sub-pixel element 408 includes a photodetector 416, depicted in the figure as a photodiode, and an associated neuromorphic element 420. The neuromorphic element 420 will be biased using an external power supply along with the photodetector 416 to generate a quiescent output 904. The output 904 from each sub-pixel element 408 can be modified by modifying the value held by the neuromorphic element 420. For instance, where the neuromorphic element 420 is a memristor, the value held thereby can be modified by applying an incident optical signal and/or by the application of voltage pulses using an external pulse generator, to produce a weighted sub-pixel output 912. The output signals from the sub-pixel elements are provided to a summing node 916. The summed outputs of the sub-pixels can be modified by the application of a further selectable bias, depicted in the figure as a variable amplifier 920, in which case the summing node 916 can be provided as an input to the variable amplifier 920. The resulting summed and biased output 924 of the sub-pixel elements 408 is then provided to an input node of a comparator 928, which compares that value 924 to a reference or threshold value 932. Alternatively, where a further selectable bias is not provided, the summing node 916 can be implemented as the input node of the comparator 928. Based on the comparison of the value at the input to the comparator 928 to the reference value 932, an artificial intelligence pixel output 612 may be generated (or not). In accordance with embodiments of the present disclosure, the artificial intelligence pixel output 612 can be provided as a digital value (i.e. a 1 or a 0). In accordance with other embodiments of the present disclosure, the artificial intelligence pixel output 612 can be provided as an analog pixel value based on the outputs of the included sub-pixel elements 408, or as a zero.

The values or weights of the included neuromorphic elements 420, the amount of bias provided by any included amplifier elements 908 and 920, and the reference value 932 provided to the comparator 928 within each artificial intelligence pixel 404 of the intelligent sensor array 204 can be set during a training process. The training process can include providing training data as input, and dynamically adjusting the neuromorphic elements of the artificial intelligence pixels 404 in response to the estimation errors in the feedforward estimation value produced by the artificial intelligence pixels 404. The algorithm used for training can include a delta adaptation algorithm, segmentation algorithms and any combination of algorithms required by the mission application.

Figure 13:
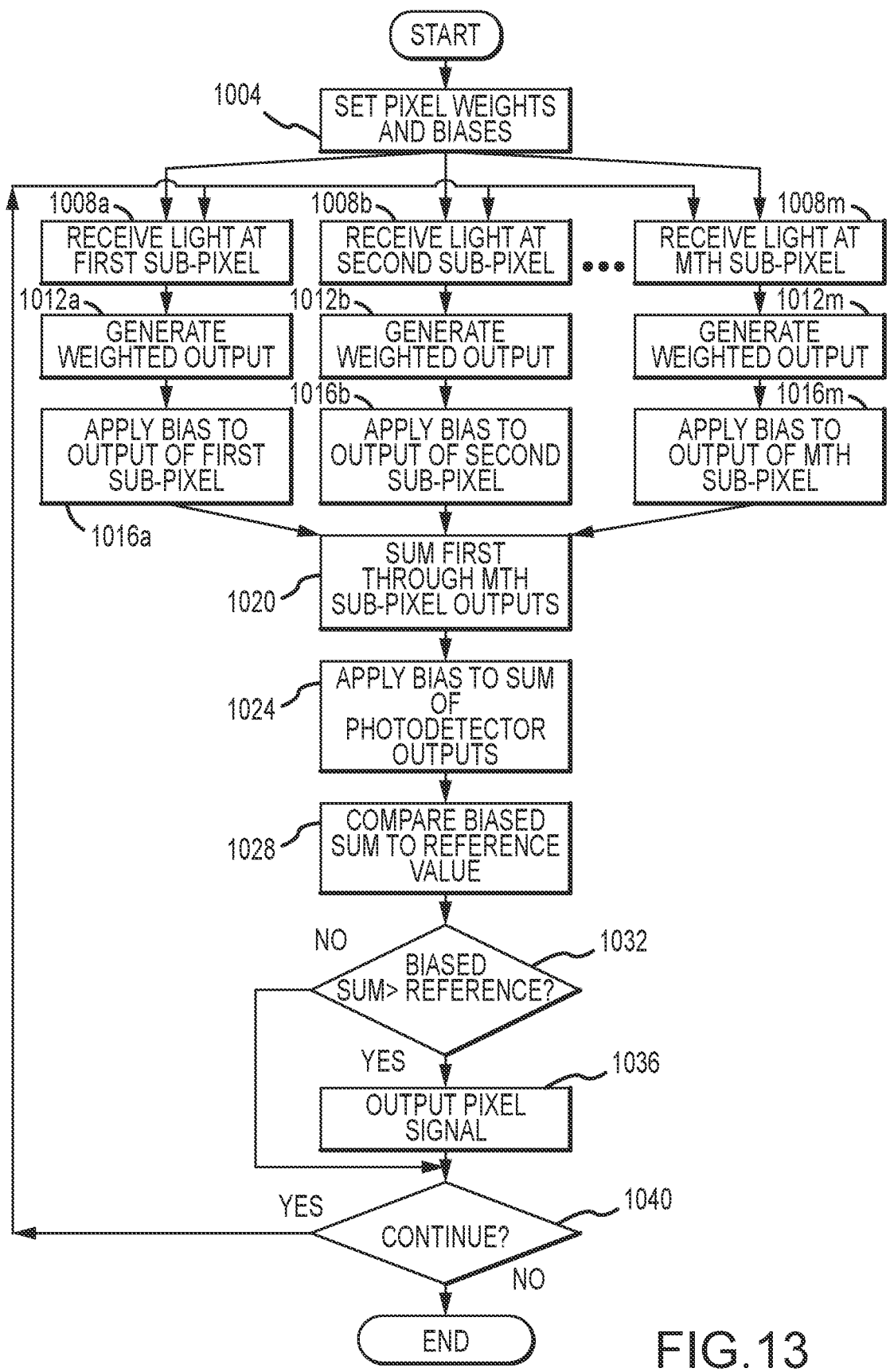
FIG. 13 is a flowchart depicting a method of operation of a sensor element incorporating an intelligent sensor array in accordance with embodiments of the present disclosure.

FIG. 13 is a flowchart depicting aspects of a method of operation of a sensor element incorporating an intelligent sensor array 204 in accordance with embodiments of the present disclosure. Initially, the weights, biases, and reference values of the pixels 404 of the intelligent sensor array 204, and of any higher level data summation and aggregation blocks 616, are set through a training process (step 1004). Once trained, the intelligent sensor array 204 is ready to be deployed. As can be appreciated by one of skill in the art after consideration of the present disclosure, an intelligent sensor array 204 can be trained to perform various functions. Such functions can include pattern recognition, such as the identification, recognition, or classification of an object 124 within a scene or field of view 116, and change or event detection, such as the appearance in or movement of an object 124 within a scene or field of view 116. More particularly, embodiments of the present disclosure provide an intelligent sensor array 204 that can perform pattern recognition, segmentation, event or change detection, or other functions in response to optical inputs 422 sensed by photodetectors 416 using hardware that is integrated with or provided as part of the intelligent sensor array 204. Moreover, the intelligent sensor array 204 can be trained or otherwise configured to produce an output only when the output is deemed to be relevant or probably relevant to a data consumer 112.

The trained intelligent sensor array 204 can then be operated. During operation, light is received at the sub-pixels 408a-m of each artificial intelligence pixel 404 (step 1008). In FIG. 13, the operation of a single artificial intelligence pixel 404 is depicted. However, as can be appreciated by one of skill in the art after consideration of the present disclosure, when operated as an image sensor, the light is incident on the photodetectors 416 of the sub-pixel elements 408 of all of the artificial intelligence pixels 404 included in the intelligent sensor array 204 simultaneously or essentially simultaneously, during a common exposure period. In accordance with other embodiments of the present disclosure, the intelligent sensor array 204 can be operated as an event detection sensor, in which sub-pixel elements 408 of different artificial intelligence pixels 404 operate asynchronously, and in particular over exposure periods that can be different from one another. In response to receiving light at the sub-pixel elements 408, the included photodetectors 416 produce an output (i.e. an electrical current or charge) that is proportional to the amount of light incident on the photodetectors 416. Moreover, in accordance with embodiments of the present disclosure, each sub-pixel element 408 produces a weighted output 904 that depends on the value of the neuromorphic element 420 of that sub-pixel element 408, as well as on the amount of input light (step 1012). Next, a selectable bias can be applied to each of the sub-pixel element 408 outputs 904, thereby creating a biased sub-pixel output 912 (step 1016).

The biased sub-pixel outputs 912 of each of the sub-pixel elements 408 within the artificial intelligence pixel 404 are then summed (step 1020). For example, the biased sub-pixel element outputs 912 of all of the sub-pixels 408 within an artificial intelligence pixel 404 can be provided to a summing node 916 for that artificial intelligence pixel 404. At step 1024, a bias can be applied to the sum of the m sub-pixel elements 408 within that artificial intelligence pixel 404, to produce a biased sum 924. The biased sum 924 is then compared to a reference value 932 (step 1028). Depending on the comparison, an output 612 is provided from the artificial intelligence pixel 404 (step 1032). For example, if the biased sum 924 is greater than the reference value 932, a pixel signal 612 is output (step 1036). In accordance with embodiments of the present disclosure, the pixel signal 612 can be output as a value of 1. In accordance with other embodiments of the present disclosure, the pixel signal 612 can be provided as an analog value that is based on the sum of the outputs 904 or 912 of the sub-pixel elements 408 within the artificial intelligence pixel 404. Alternatively, and continuing the foregoing example, if the biased sum 924 is less than the reference value 932, no pixel signal is output (or a value of zero can be provided). A determination can then be made as to whether the process is to continue (step 1040). If the process is to continue, it returns to step 1008, at which the sub-pixel elements 408 within the artificial intelligence pixel 404 are operated to receive light. Alternatively, the process can end.

Embodiments of the present disclosure provide artificial intelligence pixels 404 that can be implemented as hardware components included in or associated with an intelligent sensor system 108. In at least some embodiments, each artificial intelligence pixel 404 includes a plurality of sub-pixel elements 408. The sub-pixel elements 408 can be configured as a sub-array within the intelligent sensor array 204 of the intelligent sensor system 108. By incorporating neuromorphic elements 420 as weights, the responsivity of each of the sub-pixel elements 408 to input light can be varied. The weighted outputs 904 of each of the sub-pixel elements 408 within an artificial intelligence pixel 404, which can be individually biased to produce a biased sub-pixel output 912, are summed at a summing node 916. The summed value can be biased, producing a biased output 924. That biased output is compared to a reference value 932. The value of each sub-pixel element's 408 weight and bias amount, and the value of each artificial intelligence pixel's 404 bias and reference value 932, can be set during a training process. Whether the artificial intelligence pixel 404 produces an output in response in response to the summed and biased output 924 depends on a comparison to the reference value 932. For example, in at least some embodiments, if the summed and biased output 924 is greater than the reference value 932, a pixel output 612 is provided to a further layer of the intelligent sensor system 108. That further layer can include a layer that performs summation and comparison of multiple artificial intelligence pixels outputs 612, or a digital physical infrastructure layer 316.

By selectively providing outputs 612 from artificial intelligence pixels 404, the data handling and processing requirements of the intelligent sensor system 108 can be much less than that of a conventional focal plane array, in which all signals produced by photodetector elements are provide as the output of that conventional focal plane array. In accordance with at least some embodiments of the present disclosure, the artificial intelligence pixels 404 are trained to perform change detection. In accordance with further embodiments of the present disclosure, the artificial intelligence pixels 404 are trained to perform segmentation and pattern recognition. This in turn enables the intelligent sensor system 108 to perform object identification and background suppression. Moreover, because one or more layers of the neural network used to determine whether artificial intelligence pixels 404 provide an output 612, operation of an intelligent sensor system 108 as described herein can suppress background noise, reducing data handling and processing requirements. In addition, the processing performed by the artificial intelligence pixels 404 can be faster, more power efficient, and more compact than a neural network implemented in software in connection with a conventional focal plane array incorporating a like number of photodetector elements.

The foregoing discussion has been presented for purposes of illustration and description. Further, the description is not intended to limit the disclosed structures, systems, and methods to the form disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed structures, systems, and methods, and to enable others skilled in the art to utilize the disclosed structures, systems, and methods in such or in other embodiments and with various modifications required by the particular application or use. It is intended that the appended claims be construed to include alternative embodiments to the extent permitted by the prior art.

What is claimed is:

1. An intelligent sensor system, comprising:
    a sensor array, including:
        a plurality of artificial intelligence pixels, each artificial intelligence pixel in the plurality of artificial intelligence pixels including:
            a plurality of sub-pixel elements, each sub-pixel element in the plurality of sub-pixel elements including:
                a photodetector; and
                a neuromorphic element;
            an artificial intelligence pixel summing node, wherein a weighted output from each sub-pixel element in the plurality of sub-pixel elements is provided to the artificial intelligence pixel summing node; and
            an artificial intelligence pixel comparator, wherein the artificial intelligence pixel comparator operates to compare a summed output of the sub-pixel elements provided to the artificial intelligence pixel summing node to a first reference value established for the artificial intelligence pixel comparator, and wherein the artificial intelligence pixel comparator further operates to provide an output in response to a first comparison result; and
        a plurality of summation and data reduction blocks, wherein each summation and data reduction block includes:
            a summation and data reduction block summing node, wherein an output from at least some of the artificial intelligence pixels is received at the summation and data reduction block summing node; and
            a summation and data reduction block comparator, wherein the summation and data reduction block comparator operates to compare a summed output of the at least some of the artificial intelligence pixels to a second reference value established for the summation and data block comparator, and wherein the summation and data reduction block comparator further operates to provide an output in response to a second comparison result.

2. The intelligent sensor system of claim 1, further comprising:
    a digital physical infrastructure layer, wherein outputs from the artificial intelligence pixels are received at the digital physical infrastructure layer, and wherein the digital physical infrastructure layer formats the outputs from the artificial intelligence pixels.

3. The intelligent sensor system of claim 2, further comprising:
    a communication interface, wherein the communication interface provides a formatted version of the output from the digital physical infrastructure layer to a data consumer.

4. The intelligent sensor system of claim 1, wherein, in each sub-pixel element, the photodetector is integrated with the neuromorphic element, and wherein the neuromorphic element is one of a memristor, a memcapacitor, or a meminductor.

5. The intelligent sensor system of claim 4, wherein a value of each neuromorphic element is set during a training process.

6. The intelligent sensor system of claim 5, wherein a value of each reference value is set during a training process.

7. The intelligent sensor system of claim 6, wherein at least some of the artificial intelligence pixels are trained to perform change detection.

8. The intelligent sensor system of claim 6, wherein at least some of the artificial intelligence pixels are trained to perform object recognition.

9. The intelligent sensor system of claim 6, wherein at least some of the artificial intelligence pixels are trained to perform segmentation.

10. The intelligent sensor system of claim 1, further comprising:
    a platform, wherein the sensor array is carried by the platform;
    an optical assembly, wherein the optical assembly directs light to the sensor array; and
    a communication interface, wherein an output from at least some of the artificial intelligence pixels is provided to a data consumer by the communication interface.

11. A method of providing an intelligent sensor, comprising:
    providing a sensor array, including:
        a plurality of artificial intelligence pixels, each artificial intelligence pixel in the plurality of artificial intelligence pixels including:

a plurality of sub-pixel elements, each sub-pixel element in the plurality of sub-pixel elements including:
  a photodetector; and
  a neuromorphic element;
an artificial intelligence pixel summing node, wherein a weighted output from each sub-pixel element in the plurality of sub-pixel elements is provided to the artificial intelligence pixel summing node; and
an artificial intelligence pixel comparator, wherein the artificial intelligence pixel comparator operates to compare a summed output of the sub-pixel elements provided to the artificial intelligence pixel summing node to a first reference value established for the artificial intelligence pixel comparator, and wherein the artificial intelligence pixel comparator further operates to provide an output in response to a first comparison result; and
a plurality of summation and data reduction blocks, wherein each summation and data reduction block includes:
  a summation and data reduction block summing node, wherein an output from at least some of the artificial intelligence pixels is received at the summation and data reduction block summing node; and
  a summation and data reduction block comparator, wherein the summation and data reduction block comparator operates to compare a summed output of the at least some of the artificial intelligence pixels to a second reference value established for the summation and data block comparator, and wherein the summation and data reduction block comparator further operates to provide an output in response to a second comparison result;

exposing the plurality of photodetectors of the sub-pixel elements of an artificial intelligence pixel included in the plurality of artificial intelligence pixels to light, wherein, for each photodetector in the plurality of photodetectors, a value of a neuromorphic element integrated with the photodetector is selected during a training process to determine a responsivity of the photodetector to incident light;

summing a weighted output from each of the photodetectors in the plurality of photodetectors produced in response to the photodetectors being exposed to the light in the artificial intelligence pixel summing node;

comparing the summed and weighted output to the first reference value in the artificial intelligence comparator, wherein the first reference value is selected during the training process; and providing an artificial intelligence pixel output in response to a first comparison result.

12. The method of providing an intelligent sensor of claim 11, wherein the sensor array is trained to perform change detection.

13. The method of providing an intelligent sensor of claim 11, wherein the sensor array is trained to perform object recognition.

14. The method of providing an intelligent sensor of claim 11, wherein the sensor array is trained to perform segmentation.

15. The method of providing an intelligent sensor of claim 11, wherein the sensor array is trained to perform a wide variety of signal and image processing.

* * * * *